United States Patent
Kucherov et al.

(10) Patent No.: US 10,996,887 B2
(45) Date of Patent: May 4, 2021

(54) CLUSTERED STORAGE SYSTEM WITH DYNAMIC SPACE ASSIGNMENTS ACROSS PROCESSING MODULES TO COUNTER UNBALANCED CONDITIONS

(71) Applicant: EMC IP Holding Company LLC, Hopkinton, MA (US)

(72) Inventors: Anton Kucherov, Dudley, MA (US); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 16/397,370

(22) Filed: Apr. 29, 2019

(65) Prior Publication Data

US 2020/0341682 A1    Oct. 29, 2020

(51) Int. Cl.
*G06F 3/06* (2006.01)
*G06F 17/11* (2006.01)
*H04L 9/06* (2006.01)

(52) U.S. Cl.
CPC .......... *G06F 3/0658* (2013.01); *G06F 3/0604* (2013.01); *G06F 3/067* (2013.01); *G06F 3/0629* (2013.01); *G06F 17/11* (2013.01); *G06F 2206/1012* (2013.01); *H04L 9/0643* (2013.01)

(58) Field of Classification Search
None
See application file for complete search history.

(56) References Cited

U.S. PATENT DOCUMENTS 7,000,229 B2   2/2006  Gere
7,444,464 B2  10/2008  Urmston et al.
7,818,736 B2  10/2010  Appavoo et al.
8,095,726 B1   1/2012  O'Connell et al.
8,214,612 B1   7/2012  Natanzon
(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free," https://store.emc.com/xtremio, Jul. 2014, 2 pages.

(Continued)

*Primary Examiner* — Kaushikkumar M Patel
(74) *Attorney, Agent, or Firm* — Ryan, Mason & Lewis, LLP

(57) ABSTRACT

A storage system comprises multiple storage nodes each comprising at least one storage device. Each of the storage nodes further comprises a set of processing modules configured to communicate over one or more networks with corresponding sets of processing modules on other ones of the storage nodes. The sets of processing modules of the storage nodes each comprise at least one data module and at least one control module. The storage system is configured to assign portions of a content-based signature space of the storage system to respective ones of the data modules, and to assign portions of a logical address space of the storage system to respective ones of the control modules. The assignment of portions of the logical address space to the control modules is configured to at least partially offset an unbalanced condition between local physical storage capacities of the data modules.

20 Claims, 9 Drawing Sheets

(56) References Cited

U.S. PATENT DOCUMENTS

| | | | |
|---|---|---|---|
| 8,769,522 | B2 | 7/2014 | Venkatraman et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,261,693 | B1* | 4/2019 | Schneider ............. G06F 12/109 |
| 2004/0117414 | A1 | 6/2004 | Braun et al. |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2012/0124282 | A1* | 5/2012 | Frank ................... G06F 3/0641 |
| | | | 711/108 |
| 2013/0054727 | A1* | 2/2013 | Kumano ............... G06F 3/0631 |
| | | | 709/212 |
| 2013/0325824 | A1 | 12/2013 | Shoens |
| 2014/0181016 | A1 | 6/2014 | Whitehead et al. |
| 2015/0006482 | A1* | 1/2015 | Hardy .................. G06F 16/2365 |
| | | | 707/613 |
| 2015/0355863 | A1* | 12/2015 | Kimmel ................ G06F 3/0619 |
| | | | 711/114 |
| 2016/0085839 | A1* | 3/2016 | D'Halluin .............. G06F 16/21 |
| | | | 707/747 |
| 2016/0140140 | A1* | 5/2016 | Darcy ................... G06F 16/182 |
| | | | 707/827 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0366226 | A1* | 12/2016 | Friedman ............. G06F 3/0608 |
| 2017/0177611 | A1* | 6/2017 | Gowdappa ............ G06F 16/182 |
| 2017/0192857 | A1 | 7/2017 | Meiri et al. |

OTHER PUBLICATIONS

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—a Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—a Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/012,990 filed in the name of David Meiri et al. on Jun. 20, 2018 and entitled "Clustered Storage System with Stateless Inter-Module Communication for Processing of Count-Key-Data Tracks."

* cited by examiner

ADDRESS-TO-HASH (A2H) TABLE

| | | |
|---|---|---|
| LOGICAL ADDRESS 1 | HASH HANDLE OF DATA PAGE | OTHER FIELDS |
| LOGICAL ADDRESS 2 | HASH HANDLE OF DATA PAGE | OTHER FIELDS |
| ... | ... | ... |
| LOGICAL ADDRESS M | HASH HANDLE OF DATA PAGE | OTHER FIELDS |

TABLE KEY

PHYSICAL LAYER BASED (PLB) TABLE

| PHYSICAL OFFSET 1 | HASH DIGEST OF DATA PAGE | OTHER FIELDS |
| PHYSICAL OFFSET 2 | HASH DIGEST OF DATA PAGE | OTHER FIELDS |
| ... | ... | ... |
| PHYSICAL OFFSET P | HASH DIGEST OF DATA PAGE | OTHER FIELDS |

TABLE KEY

CLUSTERED STORAGE SYSTEM WITH DYNAMIC SPACE ASSIGNMENTS ACROSS PROCESSING MODULES TO COUNTER UNBALANCED CONDITIONS

FIELD

The field relates generally to information processing systems, and more particularly to storage in information processing systems.

BACKGROUND

Various types of content addressable storage systems are known. Some content addressable storage systems allow data pages of one or more logical storage volumes to be accessed using content-based signatures that are computed from content of respective ones of the data pages. Such content addressable storage system arrangements facilitate implementation of deduplication and compression. For example, the storage system need only maintain a single copy of a given data page even though that same data page may be part of multiple logical storage volumes. Although these and other content addressable storage systems typically provide a high level of storage efficiency through deduplication and compression, problems can arise under certain conditions. For example, conventional techniques for allocating resources across multiple processing modules in clustered implementations of content addressable systems can sometimes lead to sub-optimal system performance.

SUMMARY

Illustrative embodiments provide clustered storage systems with functionality for dynamic assignment of content-based signature and logical address spaces across processing modules to counter unbalanced conditions in local physical storage capacities. Such embodiments can optimize clustered storage system performance in an unbalanced cluster configuration while also guaranteeing the ability to support a future scale-up of the clustered storage system to a balanced cluster configuration.

These embodiments illustratively include a clustered implementation of a content addressable storage system having a distributed storage controller. Similar advantages can be provided in other types of storage systems.

In one embodiment, an apparatus comprises a storage system that includes multiple storage nodes each comprising one or more storage devices. Each of the storage nodes further comprises a set of processing modules configured to communicate over one or more networks with corresponding sets of processing modules on other ones of the storage nodes. The sets of processing modules each comprise at least one data module and at least one control module, and in some embodiments can include additional modules, such as routing modules and at least one management module. The storage system is configured to assign portions of a content-based signature space of the storage system to respective ones of the data modules and to assign portions of a logical address space of the storage system to respective ones of the control modules. The assignment of portions of the logical address space to the control modules is configured to at least partially offset an unbalanced condition between local physical storage capacities of the data modules.

By way of example, the portions of the content-based signature space are illustratively assigned to respective ones of the data modules in proportion to their respective local physical storage capacities, and the portions of the logical address space are illustratively assigned to the control modules in inverse proportion to the assignment of portions of the content-based signature space to the data modules. Other types and arrangements of logical address space assignments configured to at least partially offset an unbalanced condition may be used.

In some embodiments, the sets of processing modules comprise respective servers that collectively implement at least a portion of a distributed storage controller of the storage system. The assignment of portions of the content-based signature space to the data modules and the assignment of portions of the logical address space to the control modules are illustratively implemented at least in part by at least one system-wide management module of the distributed storage controller.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 4A, 4B, 4C and 4D show examples of logical layer and physical layer mapping tables in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
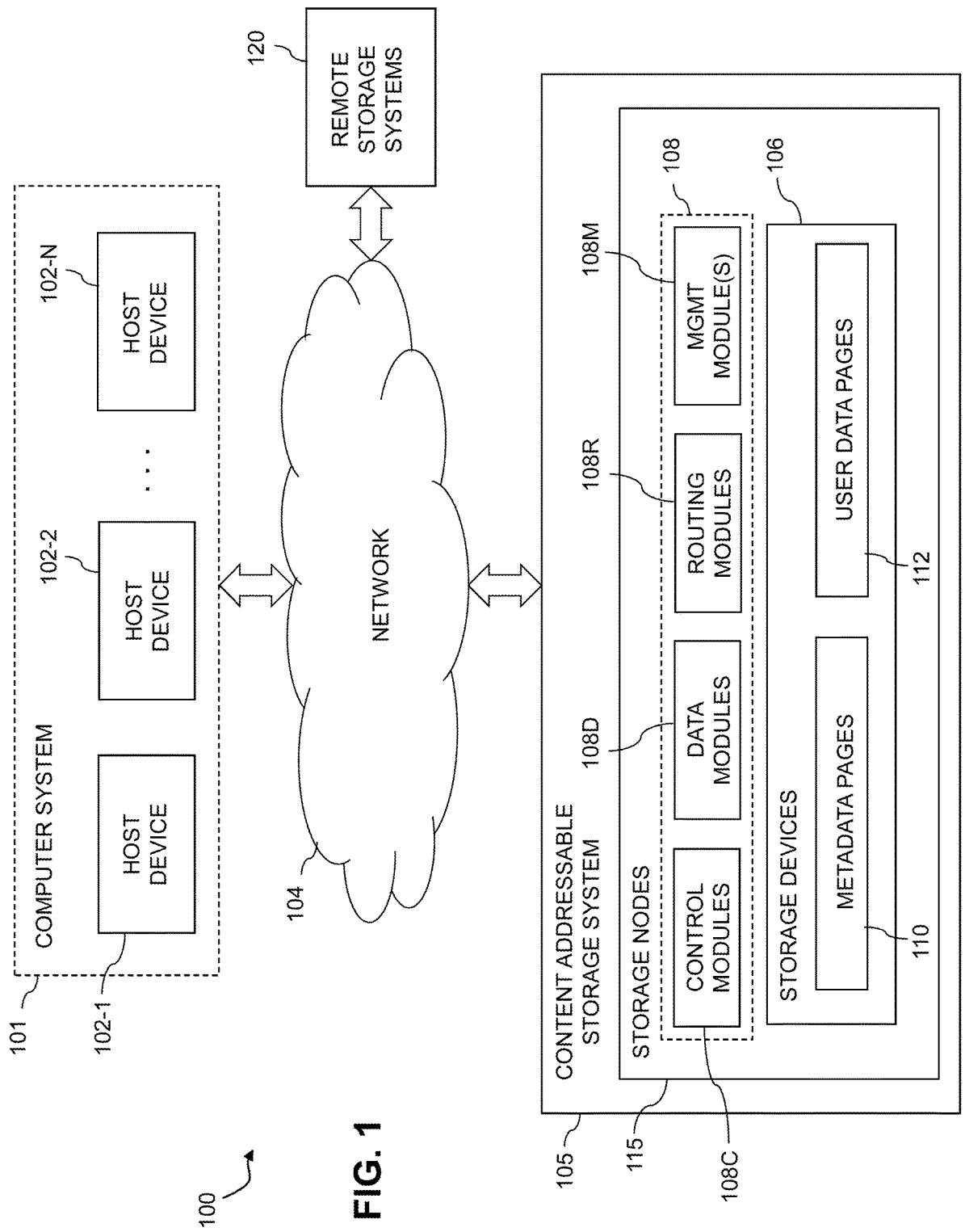
FIG. 1 is a block diagram of an information processing system comprising a content addressable storage system configured to implement dynamic assignment of content-based signature and logical address spaces across processing modules to counter unbalanced conditions in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate dynamic assignment of content-based signature and logical address spaces as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments.

The system 100 further comprises remote storage systems 120 coupled to network 104. A given such remote storage system illustratively comprises another instance of the content addressable storage system 105, or another type of storage system, possibly also implemented as a clustered storage system comprising a plurality of nodes. The given remote storage system may be viewed as an example of an additional storage system that participates with the content addressable storage system 105 in a replication process, a migration process or another type of multi-system process.

It should be noted in this regard that the term "remote" as used herein, in the context of remote storage systems 120 and elsewhere, is intended to be broadly construed, and should not be interpreted as requiring any particular geographic location relationship to the content addressable storage system 105. For example, the given remote storage system can be in a different data center than the content addressable storage system 105, or could alternatively be at a different location within the same physical site. The term "remote" in illustrative embodiments herein can therefore simply indicate that the corresponding storage system is physically separate from the content addressable storage system 105.

Although multiple remote storage systems 120 are shown in the figure, it is to be appreciated that some embodiments may include only a single remote storage system that is utilized as a source or target for a replication or migration process. Other embodiments can include only a single storage system and no remote storage systems. Accordingly, remote systems are not a requirement.

Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

A given set of processing modules implemented on a particular one of the storage nodes 115 therefore comprises at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

It is assumed in some embodiments that the processing modules of the distributed storage controller 108 are interconnected in a full mesh network, such that a process of one of the processing modules can communicate with processes of any of the other processing modules. Commands issued by the processes can include, for example, remote procedure calls (RPCs) directed to other ones of the processes.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the SHA1 secure hashing algorithm, or other secure hashing algorithms known to those skilled in the art, including SHA2, SHA256 and many others. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for dynamic assignment of content-based signature and logical address spaces in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include control logic for dynamic assignment of content-based signature and logical address spaces that engages or otherwise interacts with corresponding control logic instances in at least a subset of the control modules 108C, data modules 108D and routing modules 108R in order to implement functionality for dynamic assignment of content-based signature and logical address spaces in the content addressable storage system 105.

In some embodiments, the content addressable storage system 105 comprises an XtremIO™ storage array suitably modified to incorporate techniques for dynamic assignment of content-based signature and logical address spaces as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for dynamic assignment of content-based signature and logical address spaces in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

This type of substantially even distribution is used when the local physical storage capacities of the data modules 108D of the content addressable storage system 105 are in what is referred to herein as a "balanced condition." As will be described in more detail below, different distributions of the slices to the control modules 108C are utilized in illustrative embodiments to at least partially offset what is referred to herein as an "unbalanced condition" of the data modules 108D, arising from differences between the local physical storage capacities of the data modules 108D.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 105. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments will be described below in conjunction with FIGS. 4A through 4D. These particular examples include respective A2H, H2D, HMD and physical layer based ("PLB") tables. In some embodiments, the A2H and H2D tables are utilized primarily by the control modules 108C, while the HMD and PLB tables are utilized primarily by the data modules 108D. Other associations between such mapping tables and the processing modules, as well as different types and arrangements of tables, can be used in other embodiments.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective first and second distinct types. Other types and arrangements of mapping tables or other content-based signature mapping information may be used in other embodiments.

Such mapping tables are still more generally referred to herein as "metadata structures" of the content addressable storage system 105. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

In some embodiments, metadata structures such as those described above are implemented as respective in-memory data structures of the storage nodes 115, utilizing RAM or other electronic memory of the storage nodes 115.

The logical block addresses or LBAs of a logical layer of the content addressable storage system 105 correspond to respective physical blocks of a physical layer of the content addressable storage system 105. The user data pages of the logical layer are organized by LBA and have reference via respective content-based signatures to particular physical blocks of the physical layer.

Each of the physical blocks has an associated reference count that is maintained within the content addressable storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for dynamic assignment of content-based signature and logical address spaces in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

A clustered storage system such as content addressable storage system 105 comprising storage nodes 115 can be in a balanced condition or an unbalanced condition at a given point in time. Moreover, its condition can change over time from a balanced condition to an unbalanced condition, and vice-versa, due to changes in local physical storage capacities of one or more of the storage nodes 115, possibly due to server failures or other issues.

In a balanced condition, each of the storage nodes 115 has the same local physical storage capacity, illustratively provided by implementing the same number and sizes of SSDs, HDDs or other storage devices on each storage node. Such storage nodes 115 in some embodiments comprise respective servers, each having at least a data module and a control module, although other arrangements are possible. The servers are typically interconnected by high-speed communication channels, and each is coupled to a local set of storage devices providing its local physical storage capacity. These local sets of storage devices in some embodiments comprise respective storage arrays. The servers in a balanced condition are typically designed to be equal in terms of their processing power and their other available resources, such as RAM size to support in-memory data structures utilized by their corresponding processing modules such as the data modules and control modules. Such in-memory data structures in some embodiments include tables such as the A2H and HMD tables described elsewhere herein, although other types of data structures can be used.

An unbalanced condition is illustratively created when the local sets of storage devices of the respective servers comprise different numbers and sizes of storage devices, resulting in a situation where two or more servers are each connected to different local physical storage capacities. For example, a customer for cost reduction reasons may be unable to provide the same numbers and sizes of storage devices on each of the servers. Other types of unbalanced conditions can arise in other embodiments, and the term "unbalanced condition" as used herein is therefore intended to be broadly construed. A given such unbalanced condition can result in unbalanced operation of the servers both in terms of their processing requirements and the size of their in-memory data structures. This can adversely impact the overall performance of the clustered storage system, with the servers connected to relatively small local physical storage capacities being underutilized and the servers connected to relatively large local physical storage capacities operating at or close to their maximum capabilities. Moreover, the latter servers may have insufficient memory to support their relatively large local physical storage capacities, while the former servers consume too much memory for their relatively small local physical storage capacities. This can in some cases prevent the clustered storage system from scaling up to a balanced configuration.

As will be described below, illustrative embodiments overcome these and other issues in a manner that can optimize cluster performance while also guaranteeing the ability to support a future scale-up of the cluster.

The distributed storage controller 108 of the content addressable storage system 105 in the present embodiment is configured to provide dynamic assignment of content-based signature and logical address spaces as disclosed herein. The distributed storage controller 108 is assumed to comprise a type of "processing device" as that term is broadly used herein, and more particularly comprises a plurality a plurality of distributed processing devices each including at least one processor coupled to a memory.

In providing the dynamic assignment of content-based signature and logical address spaces, the distributed storage controller 108 in this embodiment assigns portions of a content-based signature space of the content addressable storage system 105 to respective ones of the data modules 108D, and assigns portions of a logical address space of the content addressable storage system 105 to respective ones of the control modules 108C. The assignment of portions of the logical address space to the control modules 108C is configured to at least partially offset an unbalanced condition between local physical storage capacities of the data modules 108D. For example, in some embodiments the portions of the content-based signature space are assigned to respective ones of the data modules 108D in proportion to their respective local physical storage capacities, and the portions of the logical address space are assigned to the control modules 108C in inverse proportion to the assignment of portions of the content-based signature space to the data modules 108D. More detailed examples of assignments of this type will be provided elsewhere herein.

The term "inverse proportion" as used herein is intended to be broadly construed, so as to encompass variation arrangements in which an assignment of portions of a logical address space to control modules at least partially offsets an unbalanced condition attributable to differences in local physical storage capacities of respective data modules. It should not be construed as requiring strict mathematically proportionality. Alternatives to inverse proportion assignment may be used in other embodiments.

In some embodiments, the sets of processing modules comprise respective servers that collectively implement at least a portion of the distributed storage controller 108 of the content addressable storage system 105. For example, each of the storage nodes 115 can comprise a corresponding server that includes its above-described set of processing modules, including at least one control module, at least one data module, at least one routing module, and possibly a management module.

The assignment of portions of the content-based signature space to the data modules 108D and the assignment of portions of the logical address space to the control modules 108C can be implemented at least in part by at least one system-wide management module of the distributed storage controller 108.

In some embodiments, the distributed storage controller 108 of the content addressable storage system 105 initially assigns portions of the content-based signature space to respective ones of the data modules 108D in accordance with their respective local physical storage capacities, and subsequently assigns portions of the logical address space to respective ones of the control modules 108C based at least in part on the assignment of the portions of the content-based signature space to the data modules 108D, illustratively in inverse proportion to the distribution of the portions of the content-based signature space across the data module 108D.

The distributed storage controller 108 of the content addressable storage system 105 in some embodiments is further configured to detect a change in one or more of the local physical storage capacities of the data modules 108D, to modify the assignment of portions of the content-based signature space to respective ones of the data modules 108D responsive to the detected change, and to modify the assignment of portions of the logical address space to respective ones of the control modules 108C based at least in part on the modified assignment of portions of the content-based signature space to the data modules 108D.

The content-based signature space of the content addressable storage system 105 comprises one of a hash handle space of the content addressable storage system 105 and a hash digest space of the content addressable storage system 105. Accordingly, some embodiments involve assignment of a hash handle space while others involve assignment of a hash digest space. It is also possible that both such spaces may be assigned across multiple data modules using the techniques disclosed herein.

The assignment of portions of the content-based signature space of the content addressable storage system 105 to respective ones of the data modules 108D in some embodiments more particularly comprises establishing a data slice size for the content-based signature space, and assigning different data slices having the established data slice size but corresponding to different ranges of content-based signatures of the content-based signature space to each of the data modules 108D.

For example, assigning different data slices to each of the data modules 108D illustratively comprises assigning to an i-th one of the data modules 108D a number of data slices given by:

$$D_i = D_{Total} PSC_i \Big/ \sum_i PSC_i$$

where $D_i$ denotes the number of data slices assigned to the i-th one of the data modules 108D, $D_{Total}$ denotes a total number of data slices in the content addressable storage system 105, and $PSC_i$ denotes a local physical storage capacity of the i-th one of the data modules 108D. The particular data slices assigned to the i-th one of the data modules 108D collectively comprise the portion of the content-based signature space assigned to that data module.

The assignment of portions of the logical address space of the content addressable storage system 105 to respective ones of the control modules 108C in some embodiments more particularly comprises establishing a control slice size for the logical address space, and assigning different control slices having the established control slice size but corresponding to different ranges of logical addresses of the logical address space to each of the control modules 108C.

For example, assigning different control slices to each of the control modules 108C illustratively comprises assigning to an i-th one of the control modules 108C a number of control slices given by:

$$C_i = C_{Total}\left(\frac{1}{F_p D_i}\right) \bigg/ \sum_i \left(\frac{1}{F_p D_i}\right)$$

where $C_i$ denotes the number of control slices assigned to the i-th one of the control modules 108C, $C_{Total}$ denotes a total number of control slices in the content addressable storage system 105, $D_i$ denotes a number of data slices assigned to the i-th one of the data modules 108D, and $F_p$ denotes a processing factor characterizing relative processing capabilities of the data modules 108D and the control modules 108C. The particular control slices assigned to the i-th one of the control modules 108C collectively comprise the portion of the logical address space assigned to that control module.

The processing factor $F_p$ in some embodiments is given, for example, by a ratio of (i) a number of processor cycles per specified data unit size for a given one of the data modules 108D to process a data page to (ii) a number of processor cycles per specified data unit size for a given one of the control modules 108C to process a data page. The specified data unit size can be, for example, a byte or other predetermined data unit size. Other processing factors can be used in other embodiments.

Additionally or alternatively, the distributed storage controller 108 of the content addressable storage system 105 is further configured to limit an amount of memory allocated to the data modules 108D and the control modules 108C. For example, the amount of memory can be limited based at least in part on (i) a maximum expected number of data slices times a maximum data slice size and (ii) a maximum expected number of control slices times a maximum control slice size. Such a memory allocation in illustrative embodiments limits the allocation to a "worst case" scenario, so as to guarantee support for optimal performance in the presence of failures or other degraded configurations, as well as non-degraded configurations, for both unbalanced and balanced conditions.

As indicated above, the data slice size is defined by a specified range of the content-based signature space, and the control slice size is defined by a specified range of logical addresses. For example, in embodiments that utilize A2H and HMD tables of the type described elsewhere herein, the content-based signature space represented by the A2H table may be divided into control slices and the logical address space represented by the HMD table may be divided into data slices. The size of the control slice is defined by its supporting logical address range, and the size of the data slice is defined by its supporting hash range which translates into the supported portion of physical capacity on the local storage devices, assuming use of a hash function such as SHA1. Other arrangements of data and control slices based on other types of tables or metadata structures can be used.

The foregoing examples of slice assignment computations, processing factors, memory amount limitations and other features are presented for purposes of illustration only, and can be varied in other embodiments.

Also, terms such as "data module" and "control module" as used herein are intended to be broadly construed, so as to encompass, for example, different processing modules of a server implemented by a storage node running on a processing device of a clustered storage system. It is also possible that such modules may comprise respective separate nodes or other separate processing devices of a clustered storage system.

In some embodiments, initial distributions of data slices and control slices are determined for a non-degraded configuration of the content addressable storage system 105 using the above equations, such that the data slices are distributed to the data modules proportionally to the local physical storage capacities, and the control slices are distributed to the control module in inverse proportion to the distribution of the data slices. The local physical storage capacity of a given one of the data modules illustratively comprises the total capacity of all of the SSDs, HDDs or other physical storage devices associated with that data module.

As indicated previously, the storage nodes 115 in some embodiments comprise respective servers, with each of the servers comprising at least a data module and a control module. In such arrangements, the above-noted distributions more particularly involve distributing the data slices and the control slices over the servers.

After the initial distributions of the data slices and the control slices are made for the non-degraded configuration of the content addressable storage system 105, there may be one or more server failures, or other types of failures involving the storage nodes 115, resulting in a degraded configuration. Responsive to such a degraded condition, the data slices and control slices are redistributed across the respective data modules and control modules, again illustratively using the equations provided above. This redistribution ensures that the data slices continue to be distributed across the data modules in proportion to the changed local physical storage capacities, and the control slices continue to be distributed to the control module in inverse proportion to the distribution of the data slices.

This redistribution is performed in some embodiments by redistributing only the data and control slices of the failed server or servers, so as to ensure minimal data movement in the content addressable storage system 105.

It is also possible in some embodiments that the storage nodes 115 comprise respective primary servers with each of the primary servers being backed up by a secondary server, and with the local physical storage capacity of a given primary server also being accessible to its corresponding secondary server. Upon the failure of a given primary server, its corresponding secondary server assumes ownership of the local physical storage capacity, such that no movement of data is required.

The degraded condition mentioned above is illustratively a temporary condition, with one or more failed servers eventually being replaced or otherwise restored, again potentially resulting in a change in local physical storage capacities among the servers. At this point, another redistribution of the data slices and the control slices can be performed, utilizing the above equations as previously described.

These particular operations for dynamic assignment of content-based signature and logical address spaces are just examples, and additional or alternative operations can be performed in other embodiments.

Also, one or more operations for dynamic assignment of content-based signature and logical address spaces described above as being performed by the distributed storage controller 108 of the storage system 105 in other embodiments can be performed at least in part by other storage system components under the control of the distributed storage controller 108, or by one of the host devices 102. Also, storage controllers in other embodiments need not be distributed over multiple nodes, but can instead be fully contained within a given node or other type of processing device.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controller 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for dynamic assignment of content-based signature and logical address spaces as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
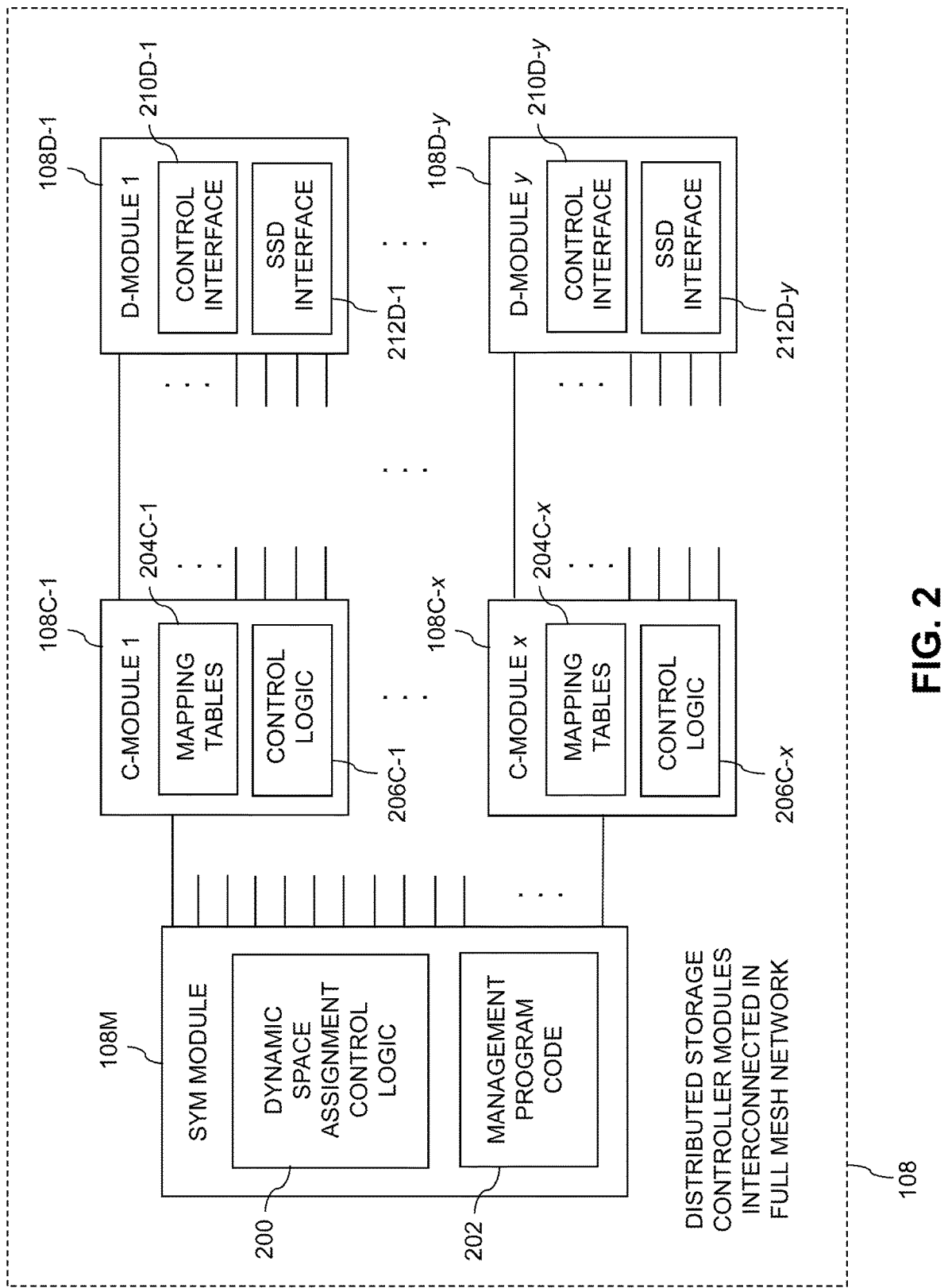
FIG. 2 illustrates a portion of a distributed storage controller of a content addressable storage system showing one possible arrangement of processing modules interconnected by a mesh network in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises dynamic space assignment control logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of mapping tables 204C-1 through 204C-x. For example, the mapping tables 204C in some implementations each illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein. The control modules 108C-1 through 108C-x further comprise corresponding instances of control logic 206C-1 through 206C-x that interact with the control logic 200 of the management module 108M to support dynamic assignment of content-based signature and logical address spaces as disclosed herein.

The control modules 108C may further comprise additional components not explicitly shown in FIG. 2, such as respective messaging interfaces that are utilized by the control modules 108 to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106.

Figure 3:
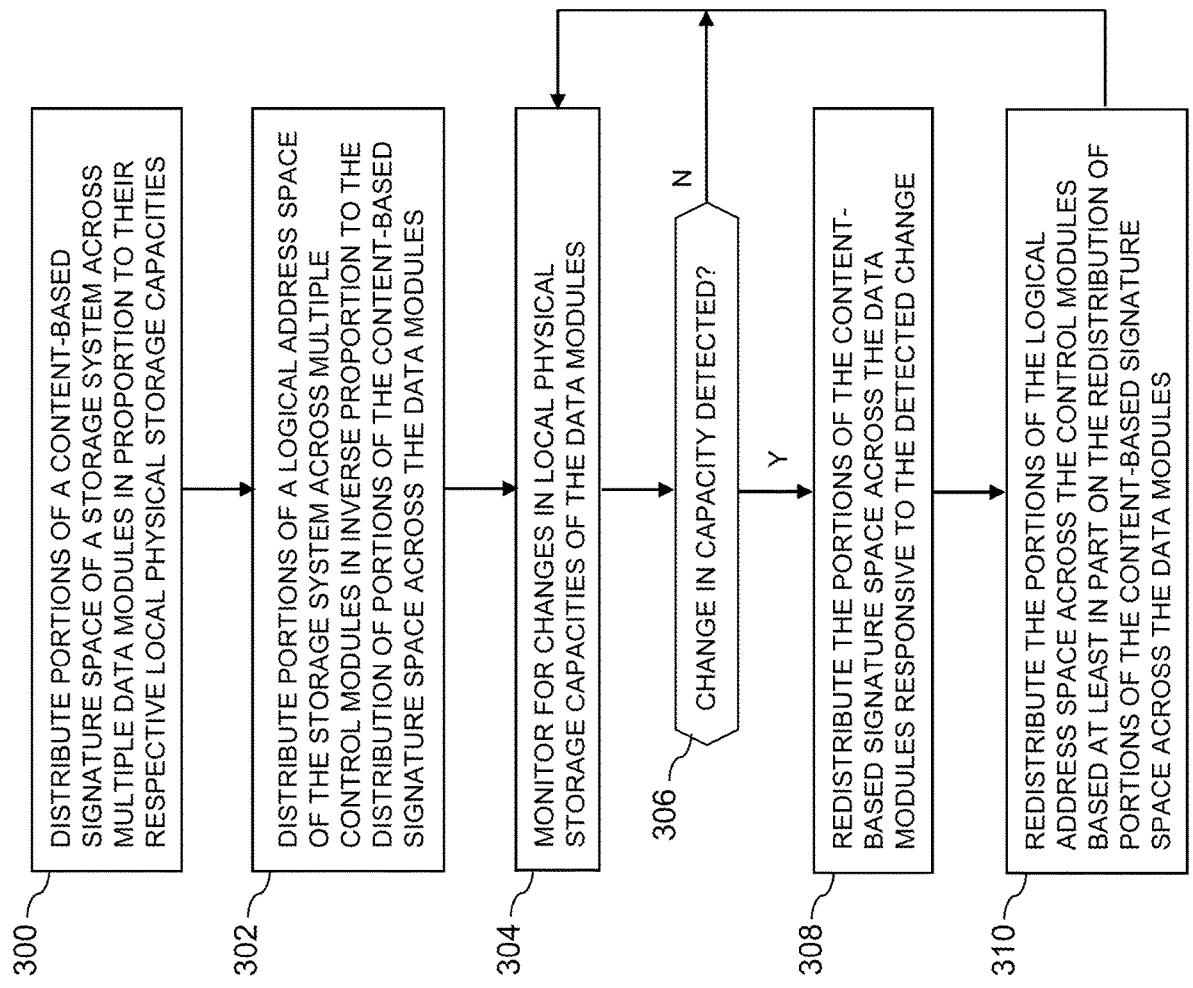
FIG. 3 is a flow diagram showing a process for dynamic assignment of content-based signature and logical address spaces across processing modules to counter unbalanced conditions in an illustrative embodiment.

The operation of the information processing system 100 will now be described in further detail with reference to the flow diagram of FIG. 3. The flow diagram of FIG. 3 illustrates a set of processing operations implementing functionality for dynamic assignment of content-based signature and logical address spaces in a content addressable storage system. The process includes steps 300 through 310, and is suitable for use in system 100 but is more generally applicable to other types of storage systems in which it is desirable to provide dynamic assignment of content-based signature and logical address spaces in a given storage system. The steps of the flow diagram are illustratively performed at least in part by or otherwise under the control of a storage controller of a storage system, such as the distributed storage controller 108 of content addressable storage system 105.

In step 300, portions of a content-based signature space of a storage system are distributed across multiple data modules of the storage system in proportion to their respective local physical storage capacities.

In step 302, portions of a logical address space of the storage system are distributed across multiple control modules of the storage system in inverse proportion to the distribution of portions of the content-based signature space across the data modules.

In step 304, local physical storage capacities of the data modules are monitored for changes.

In step 306, a determination is made as to whether or not at least one change in capacity is detected. A given detected change in capacity is illustratively a significant change in local physical storage capacity of one of the data modules where the amount of the change exceeds a designated threshold. For example, a sufficient number of SSDs or HDDs may have been either added to or removed from the local physical storage capacity of the data module so as to result in a detectable change in the capacity for that data module. These and other changes in capacity can result in some cases from server failures or other types of failures. If at least one such change in capacity is detected, the process moves to step 308, and otherwise returns to step 304 to continue monitoring the local physical storage capacities of the data modules.

In step 308, the portions of the content-based signature space are redistributed across the data modules responsive to the detected change.

In step 310, the portions of the logical address space are redistributed across the control modules based at least in part on the redistribution of portions of the content-based signature space across the data modules. For example, the redistribution of the logical address space illustratively results in the portions of the logical address space being distributed across the control modules in inverse proportion to the redistribution of the portions of the content-based signature space across the data modules. The process then returns to step 304 as indicated in order to continue monitoring the local physical storage capacities of the data modules.

Operations of the type illustrated in the flow diagram of FIG. 3 can be performed at least in part by a management module or other processing module of a distributed storage controller in a clustered storage system, such as the one or more management modules 108M of the distributed storage controller 108 in the content addressable storage system 105, although other types of storage system modules or components can be configured to perform operations of the type disclosed herein.

The particular processing operations and other system functionality described above in conjunction with the flow diagram of FIG. 3 are presented by way of illustrative example only, and should not be construed as limiting the scope of the disclosure in any way. Alternative embodiments can use other types of processing operations for implementing dynamic assignment of content-based signature and logical address spaces in a content addressable storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to support multiple instances of dynamic assignment of content-based signature and logical address spaces for multiple storage systems or different portions of a single storage system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 3 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

The FIG. 3 process makes use of various metadata structures that are maintained within the storage system. Examples of metadata structures maintained by the storage system in illustrative embodiments include the logical layer and physical layer mapping tables shown in respective FIGS. 4A, 4B, 4C and 4D. It is to be appreciated that these particular tables are only examples, and other tables or metadata structures having different configurations of entries and fields can be used in other embodiments.

Referring initially to FIG. 4A, an address-to-hash ("A2H") table 400 is shown. The A2H table 400 comprises a plurality of entries accessible utilizing logical addresses denoted Logical Address 1, Logical Address 2, . . . Logical Address M as respective keys, with each such entry of the A2H table 400 comprising a corresponding one of the logical addresses, a corresponding one of the hash handles, and possibly one or more additional fields.

Figure 4B:
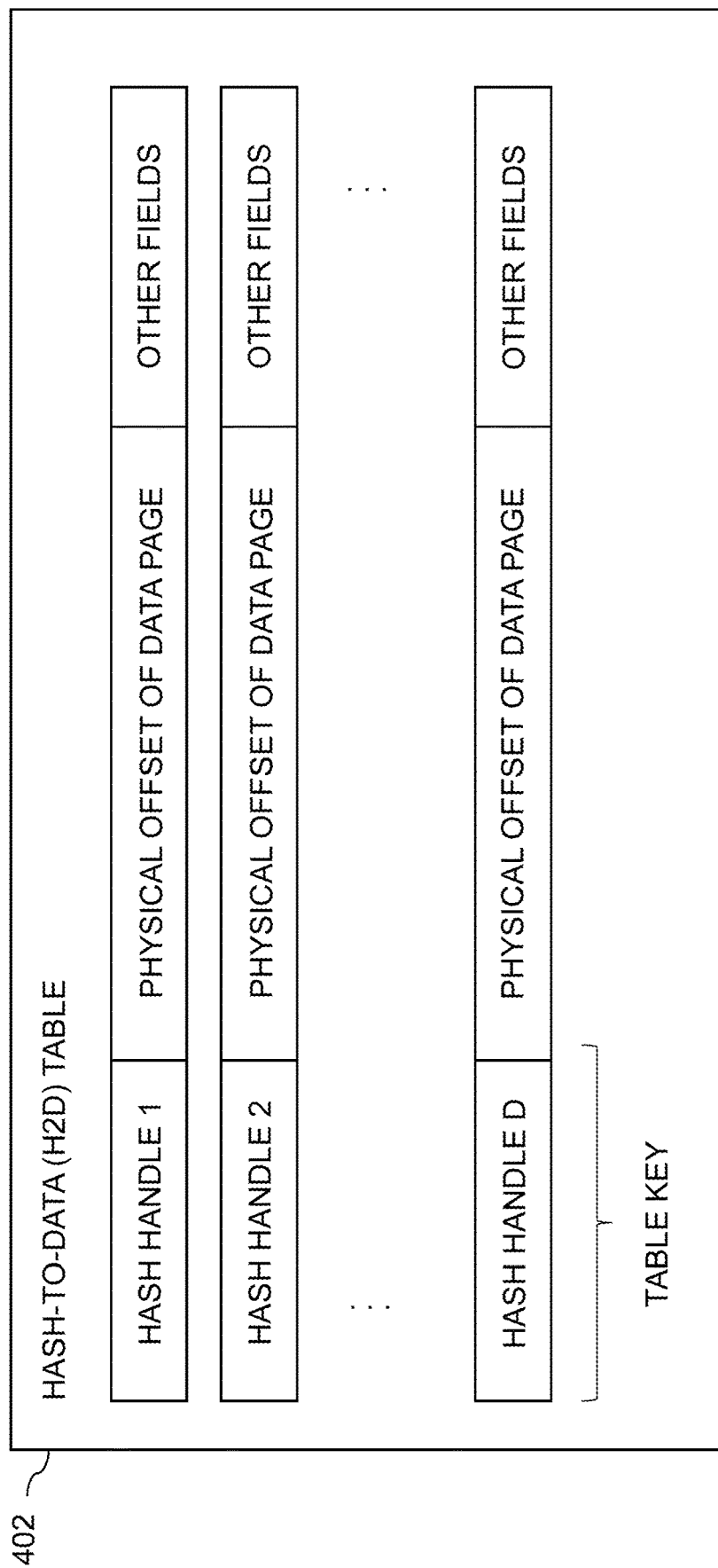

FIG. 4B shows a hash-to-data ("H2D") table 402 that illustratively comprises a plurality of entries accessible utilizing hash handles denoted Hash Handle 1, Hash Handle 2, . . . Hash Handle D as respective keys, with each such entry of the H2D table 402 comprising a corresponding one of the hash handles, a physical offset of a corresponding one of the data pages, and possibly one or more additional fields.

Figure 4C:
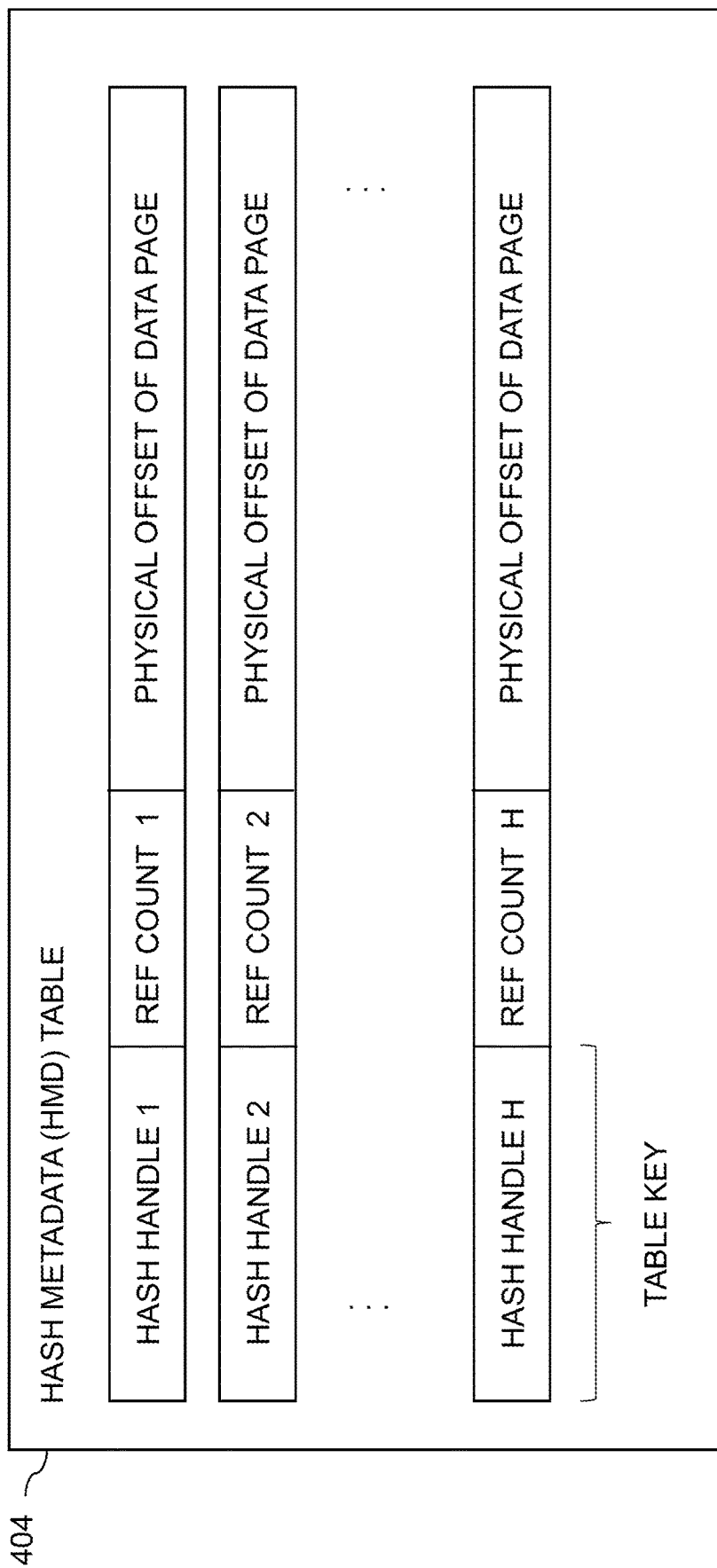

Referring now to FIG. 4C, a hash metadata ("HMD") table 404 comprises a plurality of entries accessible utilizing hash handles denoted Hash Handle 1, Hash Handle 2, . . . Hash Handle H as respective keys. Each such entry of the HMD table 404 comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. Although not explicitly so indicated in the figure, the HMD table 404 may also include one or more additional fields.

In the present embodiment, the HMD table of FIG. 4C illustratively comprises at least a portion of the same information that is found in the H2D table of FIG. 4B. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

FIG. 4D shows a physical layer based ("PLB") table 406 that illustratively comprises a plurality of entries accessible utilizing physical offsets denoted Physical Offset 1, Physical Offset 2, . . . Physical Offset P as respective keys, with each such entry of the PLB table 406 comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Collisions can arise where data pages with different content nonetheless have the same hash handle. This is a possibility in embodiments that utilize hash handles rather than full hash digests to identify data pages. Unlike the full hash digests which are generated using collision-resistant hash functions that can essentially guarantee unique hash digests for data pages with different content, the hash handles can in some cases with very small probability lead to collisions. The hash handle lengths and their manner of generation should therefore be selected so as to ensure that the collision probability is at or below a maximum acceptable level for the particular implementation.

It is to be appreciated that terms such as "table" and "entry" as used herein are intended to be broadly construed, and the particular example table and entry arrangements of FIGS. 4A through 4D can be varied in other embodiments. For example, additional or alternative arrangements of tables and entries can be used.

Illustrative embodiments of storage systems with dynamic assignment of content-based signature and logical address spaces as disclosed herein can provide a number of significant advantages relative to conventional arrangements.

For example, some embodiments provide content addressable storage systems and other types of clustered storage systems that can counter unbalanced conditions in local physical storage capacities.

Such embodiments can optimize clustered storage system performance in an unbalanced cluster configuration while also guaranteeing the ability to support a future scale-up of the clustered storage system to a balanced cluster configuration.

Illustrative embodiments can also facilitate utilization of reserved resources in support of various high-availability scenarios, such as rapid and efficient deployment of one or more backup servers responsive to server failure.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for dynamic assignment of content-based signature and logical address spaces will now be described in greater detail with reference to FIGS. 5 and 6. Although described in the context of system 100, these platforms may also be used to implement at least portions of other information processing systems in other embodiments.

Figure 5:
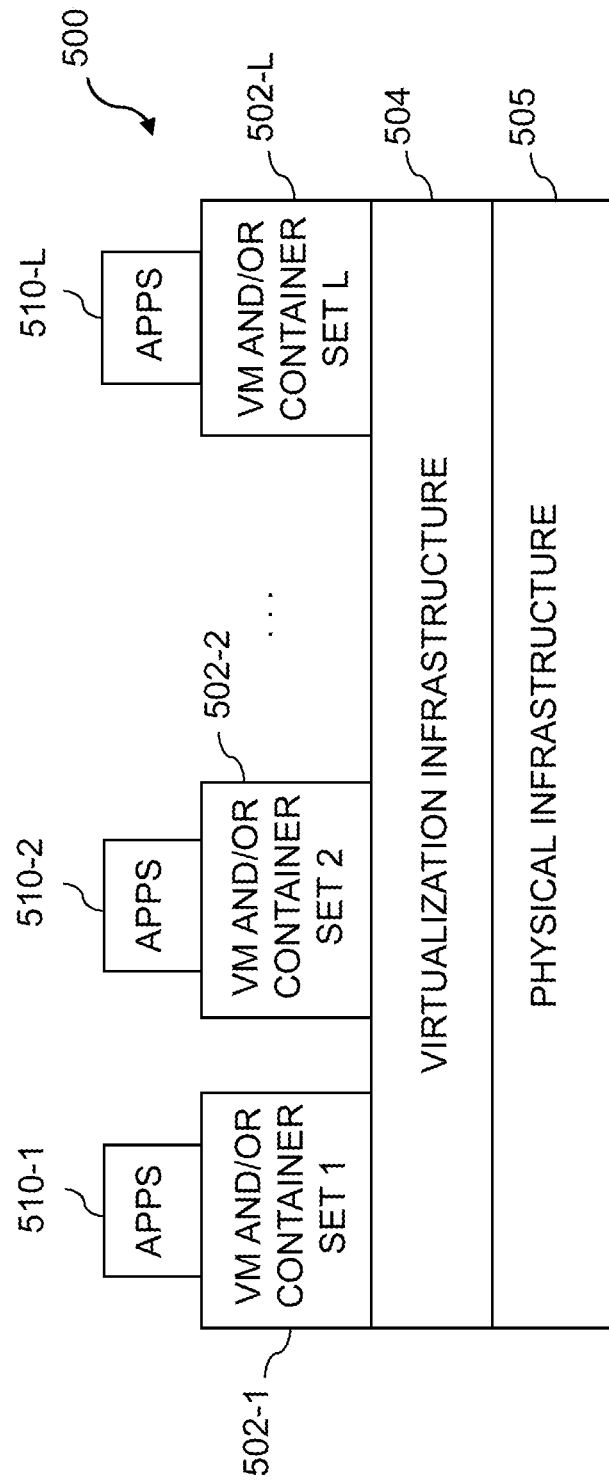
FIGS. 5 and 6 show examples of processing platforms that may be utilized to implement at least a portion of an information processing system in illustrative embodiments.
Figure 6:
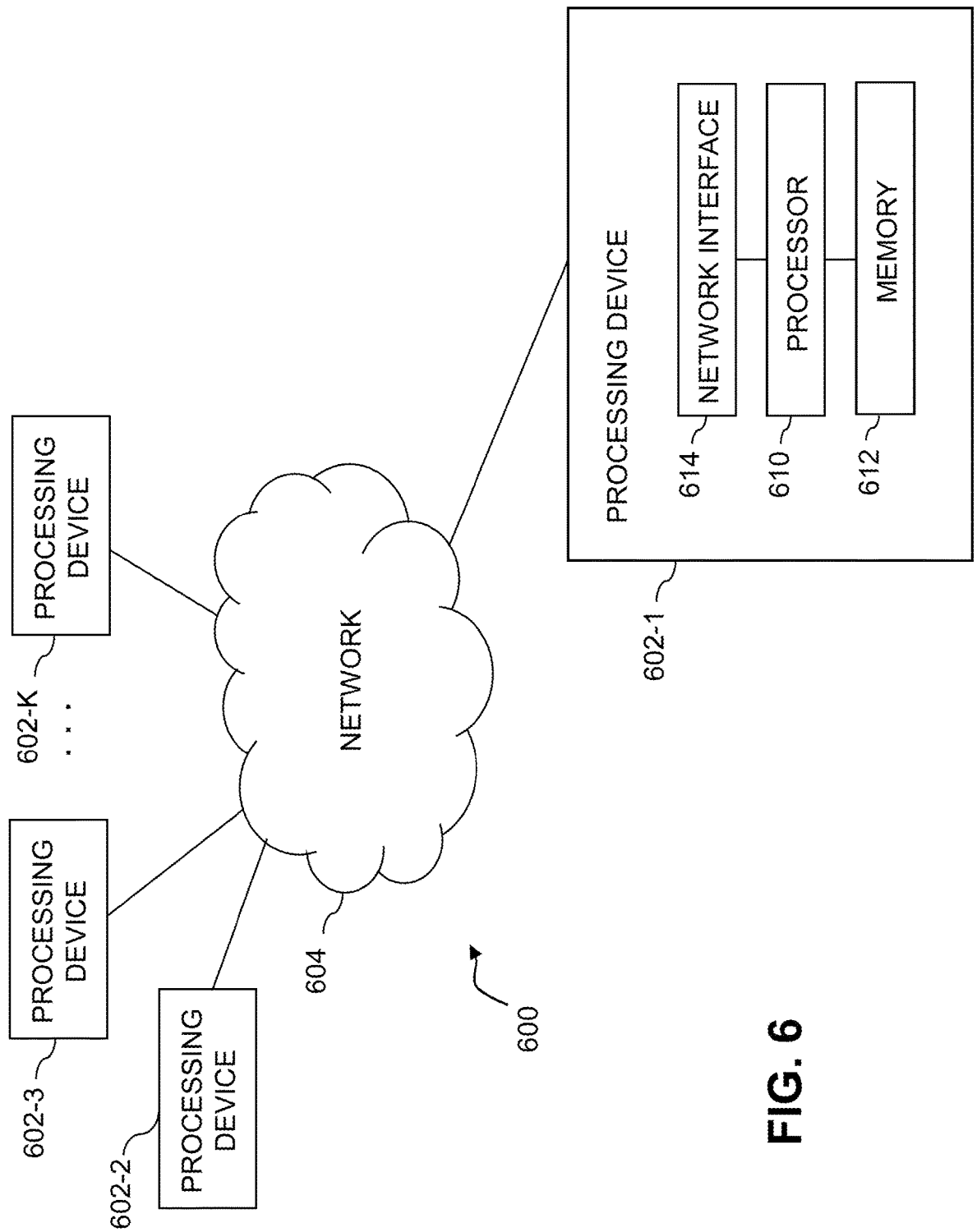

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide storage functionality of the type described above for one or more processes running on a given one of the VMs. For example, the given VM can implement one or more instances of the FIG. 3 process for dynamic assignment of content-based signature and logical address spaces.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 3 process for dynamic assignment of content-based signature and logical address spaces.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, processes for dynamic assignment of content-based signature and logical address spaces, and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage nodes each comprising one or more storage devices;
each of the storage nodes further comprising:
a processor coupled to a memory; and
a set of processing modules configured to communicate over one or more networks with corresponding sets of processing modules on other ones of the storage nodes;
the sets of processing modules of the storage nodes each comprising at least one data module and at least one control module;

the storage system being configured:
to assign portions of a content-based signature space of the storage system to respective ones of the data modules; and
to assign portions of a logical address space of the storage system to respective ones of the control modules;
wherein the portions of the content-based signature space are assigned to respective ones of the data modules in proportion to their respective local physical storage capacities;
wherein the portions of the logical address space are assigned to respective ones of the control modules in inverse proportion to the assignment of the portions of the content-based signature space to the respective ones of the data modules; and
wherein the assignment of portions of the logical address space to the control modules is configured to at least partially offset an unbalanced condition between the local physical storage capacities of the data modules.

2. The apparatus of claim 1 wherein the sets of processing modules comprise respective servers that collectively implement at least a portion of a distributed storage controller of the storage system.

3. The apparatus of claim 2 wherein the assignment of portions of the content-based signature space to the data modules and the assignment of portions of the logical address space to the control modules are implemented at least in part by at least one system-wide management module of the distributed storage controller.

4. The apparatus of claim 1 wherein the storage system initially assigns portions of the content-based signature space to respective ones of the data modules in accordance with their respective local physical storage capacities, and subsequently assigns portions of the logical address space to respective ones of the control modules based at least in part on the assignment of the portions of the content-based signature space to the data modules.

5. The apparatus of claim 1 wherein the storage system is further configured:
to detect a change in one or more of the local physical storage capacities of the data modules;
to modify the assignment of portions of the content-based signature space to respective ones of the data modules responsive to the detected change; and
to modify the assignment of portions of the logical address space to respective ones of the control modules based at least in part on the modified assignment of portions of the content-based signature space to the data modules.

6. The apparatus of claim 1 wherein the content-based signature space of the storage system comprises one of a hash handle space of the storage system and a hash digest space of the storage system.

7. The apparatus of claim 1 wherein assigning portions of the content-based signature space of the storage system to respective ones of the data modules comprises:
establishing a data slice size for the content-based signature space; and
assigning different data slices having the established data slice size but corresponding to different ranges of content-based signatures of the content-based signature space to each of the data modules.

8. The apparatus of claim 7 wherein assigning different data slices to each of the data modules comprises:
assigning to an i-th one of the data modules a number of data slices given by:

$$D_i = D_{Total} PSC_i \Big/ \sum_i PSC_i$$

wherein $D_i$ denotes the number of data slices assigned to the i-th one of the data modules, $D_{Total}$ denotes a total number of data slices in the storage system, and $PSC_i$ denotes a local physical storage capacity of the i-th one of the data modules; and
wherein the particular data slices assigned to the i-th one of the data modules collectively comprise the portion of the content-based signature space assigned to that data module.

9. The apparatus of claim 1 wherein assigning portions of the logical address space of the storage system to respective ones of the control modules comprises:
establishing a control slice size for the logical address space; and
assigning different control slices having the established control slice size but corresponding to different ranges of logical addresses of the logical address space to each of the control modules.

10. The apparatus of claim 9 wherein assigning different control slices to each of the control modules comprises:
assigning to an i-th one of the control modules a number of control slices given by:

$$C_i = C_{Total}\left(\frac{1}{F_p D_i}\right) \Big/ \sum_i \left(\frac{1}{F_p D_i}\right)$$

wherein $C_i$ denotes the number of control slices assigned to the i-th one of the control modules, $C_{Total}$ denotes a total number of control slices in the storage system, $D_i$ denotes a number of data slices assigned to the i-th one of the data modules, and $F_p$ denotes a processing factor characterizing relative processing capabilities of the data modules and the control modules; and
wherein the particular control slices assigned to the i-th one of the control modules collectively comprise the portion of the logical address space assigned to that control module.

11. The apparatus of claim 10 wherein the processing factor $F_p$ is given by a ratio of (i) a number of processor cycles per specified data unit size for a given one of the data modules to process a data page to (ii) a number of processor cycles per specified data unit size for a given one of the control modules to process a data page.

12. The apparatus of claim 1 wherein the storage system is further configured to limit an amount of memory allocated to the data modules and the control modules based at least in part on (i) a maximum expected number of data slices times a maximum data slice size and (ii) a maximum expected number of control slices times a maximum control slice size.

13. A method comprising:
configuring a storage system to include a plurality of storage nodes each comprising one or more storage devices, each of the storage nodes further comprising a set of processing modules configured to communicate over one or more networks with corresponding sets of processing modules on other ones of the storage nodes, the sets of processing modules each comprising at least one data module and at least one control module;

assigning portions of a content-based signature space of the storage system to respective ones of the data modules; and assigning portions of a logical address space of the storage system to respective ones of the control modules;

wherein the portions of the content-based signature space are assigned to respective ones of the data modules in proportion to their respective local physical storage capacities;

wherein the portions of the logical address space are assigned to respective ones of the control modules in inverse proportion to the assignment of the portions of the content-based signature space to the respective ones of the data modules;

wherein the assignment of portions of the logical address space to the control modules is configured to at least partially offset an unbalanced condition between the local physical storage capacities of the data modules; and wherein the method is performed by at least one processing device comprising a processor coupled to a memory.

14. The method of claim 13 wherein assigning portions of the content-based signature space of the storage system to respective ones of the data modules comprises:

establishing a data slice size for the content-based signature space; and assigning different data slices having the established data slice size but corresponding to different ranges of content-based signatures of the content-based signature space to each of the data modules.

15. The method of claim 14 wherein assigning different data slices to each of the data modules comprises:

assigning to an i-th one of the data modules a number of data slices given by:

$$D_i = D_{Total} PSC_i \bigg/ \sum_i PSC_i$$

wherein $D_i$ denotes the number of data slices assigned to the i-th one of the data modules, $D_{Total}$ denotes a total number of data slices in the storage system, and $PSC_i$ denotes a local physical storage capacity of the i-th one of the data modules; and wherein the particular data slices assigned to the i-th one of the data modules collectively comprise the portion of the content-based signature space assigned to that data module.

16. The method of claim 13 wherein the storage system is further configured to limit an amount of memory allocated to the data modules and the control modules based at least in part on (i) a maximum expected number of data slices times a maximum data slice size and (ii) a maximum expected number of control slices times a maximum control slice size.

17. A computer program product comprising a non-transitory processor-readable storage medium having stored therein program code of one or more software programs, wherein the program code when executed by at least one processing device causes said at least one processing device:

to configure a storage system to include a plurality of storage nodes each comprising one or more storage devices, each of the storage nodes further comprising a set of processing modules configured to communicate over one or more networks with corresponding sets of processing modules on other ones of the storage nodes, the sets of processing modules each comprising at least one data module and at least one control module;

to assign portions of a content-based signature space of the storage system to respective ones of the data modules; and to assign portions of a logical address space of the storage system to respective ones of the control modules;

wherein the portions of the content-based signature space are assigned to respective ones of the data modules in proportion to their respective local physical storage capacities;

wherein the portions of the logical address space are assigned to respective ones of the control modules in inverse proportion to the assignment of the portions of the content-based signature space to the respective ones of the data modules; and wherein the assignment of portions of the logical address space to the control modules is configured to at least partially offset an unbalanced condition between the local physical storage capacities of the data modules.

18. The computer program product of claim 17 wherein said at least one processing device initially assigns portions of the content-based signature space to respective ones of the data modules in accordance with their respective local physical storage capacities, and subsequently assigns portions of the logical address space to respective ones of the control modules based at least in part on the assignment of the portions of the content-based signature space to the data modules.

19. The computer program product of claim 17 wherein the program code when executed by at least one processing device further causes said at least one processing device:

to detect a change in one or more of the local physical storage capacities of the data modules;

to modify the assignment of portions of the content-based signature space to respective ones of the data modules responsive to the detected change; and to modify the assignment of portions of the logical address space to respective ones of the control modules based at least in part on the modified assignment of portions of the content-based signature space to the data modules.

20. The computer program product of claim 17 wherein said at least one processing device is further configured to limit an amount of memory allocated to the data modules and the control modules based at least in part on (i) a maximum expected number of data slices times a maximum data slice size and (ii) a maximum expected number of control slices times a maximum control slice size.

* * * * *